United States Patent [19]
Miller et al.

[11] 3,721,807
[45] March 20, 1973

[54] CARD GRADING MACHINE

[75] Inventors: Daniel D. Miller, Sunnyvale; Donald D. Miller, Saratoga, both of Calif.

[73] Assignee: Miller Scientific Corporation, Los Gatos, Calif.

[22] Filed: Oct. 20, 1971

[21] Appl. No.: 190,732

[52] U.S. Cl. .............................. 235/61.6 E, 35/48 B
[51] Int. Cl. ........................... G06k 5/00, G09b 7/06
[58] Field of Search ........ 235/61.6 R, 61.6 E, 61.7 R; 35/48 A, 48 B; 73/156

[56] References Cited

UNITED STATES PATENTS

| | | | |
|---|---|---|---|
| 3,212,203 | 10/1965 | Atkinson | 235/61.6 E |
| 3,284,929 | 11/1966 | Azure, Jr. | 235/61.6 E |
| 3,410,990 | 11/1968 | Flaherty | 35/48 B |
| 3,412,484 | 11/1968 | Evans et al. | 35/48 B |
| 3,609,880 | 10/1971 | Arbon | 235/61.6 E |

*Primary Examiner*—Daryl W. Cook
*Attorney*—Roger S. Borovoy

[57] ABSTRACT

Apparatus for grading optically readable answer cards wherein each card to be read is marked with optically readable marks in selected predetermined locations, the apparatus comparing a marked answer card with a correctly marked master card also having optically readable marks in the locations corresponding to the correct selection of predetermined locations on the answer card. A transport carries two arrays of photosensors for simultaneously optically reading both the master card and the answer card, and comparing the readings obtained thereby.

10 Claims, 7 Drawing Figures

PATENTED MAR 20 1973　　　　　　　　　　3,721,807

INVENTORS
DANIEL D. MILLER
DONALD D. MILLER

BY *Roger A. Barry*
ATTORNEY

INVENTORS
DANIEL D. MILLER
DONALD D. MILLER
BY Royal Berry
ATTORNEY

CARD GRADING MACHINE

BACKGROUND OF THE INVENTION

1. Field of the Invention

This invention is in the field of electronic scoring machines, particularly those which employ "IBM" type cards having predetermined unpunched locations on the card for marking correct answers. Generally, the student fills in one or more of a plurality of marks in each row or column to indicate his choice of answer on a test provided him. The marked answer card is then inserted into a machine and compared with a set of correct answers to provide the student's test score. The correct answers may be in the form of a punched card, to which the answer card is compared, in the form of a stored program in the memory within the machine, or, as in the subject invention, in the form of a master card marked in the same manner as the student's themselves have marked the answer card.

2. Prior Art

Test scoring machines of the general type of the subject invention are described in U.S. Pat. No. 3,410,990 which issued Nov. 12, 1968 to W. J. Flaherty. The machine described in the Flaherty patent employs two stationary cards. The answer card is marked in the same manner as in the subject invention. The master card, however, contains the correct answers in the form of perforations or holes. The master and answer cards are inserted adjacent one another into the machine. A slideable optical reader with a light source on one side of the two adjacent cards and a photosensitive device on the opposite side is employed for reading the marks. The light is shined upon the master card, passing through the holes in the master card indicative of correct answers, and onto the desired correct answer locations on the answer card. Where there is a hole in the master card, the photosensors detect whether or not there is a corresponding mark in the answer card. If not, the answer is wrong.

One essential disadvantage of the prior art machines, such as the one exemplified in the Flaherty patent, is the requirement for punched master cards. It is inconvenient for the teacher to punch the master card. If she punches it with a conventional single hole punch, alignment of the punch is time consuming. Obviously special multiple punches are available, but means that an extra piece of equipment must be purchased; there is resistance on the part of teachers to purchase and use special punches. To overcome this, precut master cards, with the punches pre-embossed but not removed, have been employed. These have been found to be unreliable because occasionally punches come out inadvertently and therefore the master card becomes wrong. This is often not discovered until much later. As a consequence, a substantial number of answer cards will have been misgraded. Absolute reliability of the master card in test scoring using machines of this type is extremely important.

Another disadvantage of machines of the prior art is their inability to distinguish erasures and smudges from real marks. It is very difficult to properly set the photocell bias current in equipment such as that shown in the Flaherty patent to make this critical distinction.

Finally, if the student places marks in all available locations, rather than just one, most prior art machines would give him a perfect score if the teacher did not check it visually.

BRIEF DESCRIPTION OF THE INVENTION

Briefly, the apparatus of the subject invention is for grading optically readable cards wherein each card to be read is marked with optically readable marks in selected predetermined locations. The apparatus compares two marked cards, one of which is marked by the student and is hereafter called the "answer card," and the other of which is correctly marked by the teacher and is hereafter called the "master card." Both cards have optically readable marks in the locations corresponding to the correct selection of predetermined locations on the answer card. The apparatus includes a support means for holding the master and answer cards in stationary positions, and a transport means carrying two arrays of photosensors for simultaneously optically reading the master and answer cards. One array is capable of reading all of the possible predetermined locations for marks on the answer card, and the other array is capable of reading all of the possible predetermined corresponding locations of marks on the master card. Each array provides one of two opposite electrical output signals depending upon the existence or nonexistence of marks at each of the predetermined locations on the respective card being read. Finally, the apparatus requires comparison means for comparing each electrical output signal from the master card-reading array with the corresponding electrical output signal from the answer card-reading array, the coincidence between such compared signals being indicative of a correct answer on the answer card.

The invention has the advantage of not requiring a specially printed or punched master card. Accordingly, the machine compares answer and master cards which have been marked essentially in the same manner. The apparatus can thus readily distinguish between an intended mark on the answer card and a mere smudge or erasure. This was extremely difficult on the machines of the prior art. In addition, the machine of the invention completely eliminates the teacher's need to punch the master card. Teachers are much more enthusiastic about a machine where they can prepare their own master cards merely by marking the correct answers in pencil on a standard card, no special master being required. Such a machine has obtained wide acceptance in the educational community.

Finally, the machine of the invention marks an answer wrong if too many marks are made by the student. This was not possible with many machines of the prior art which employ punched master cards. Many such machines are incapable of reading unpunched answer mark locations.

DETAILED DESCRIPTION OF THE INVENTION

Figure 1:
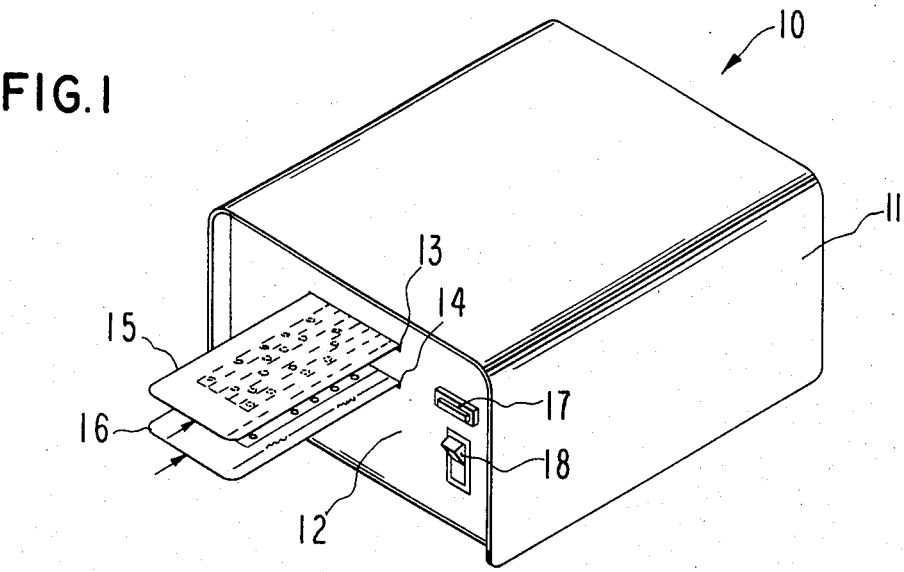
FIG. 1 is a pictorial view showing the apparatus of the invention.

FIG. 1 shows the outside of the apparatus 10 of the invention, protected by cover 11. The front of the machine 12 has openings 13 and 14 for insertion of the master card 15 and the answer card 16, respectively. The master card 15 is both inserted and removed through slot 13. The answer card 16 is inserted in the direction shown by the arrows into slot 14, but is rejected through a slot in the rear of machine 10 not visible in FIG. 1. There may be a locked cover (not shown) over slot 13 for protection of the answer, however, in most cases this is not required. FIG. 1 also shows a light 17 indicating that the machine is on, and a switch 18 used to turn the machine on and off.

Description of the Mechanical Card-Handling Apparatus

Figure 2:
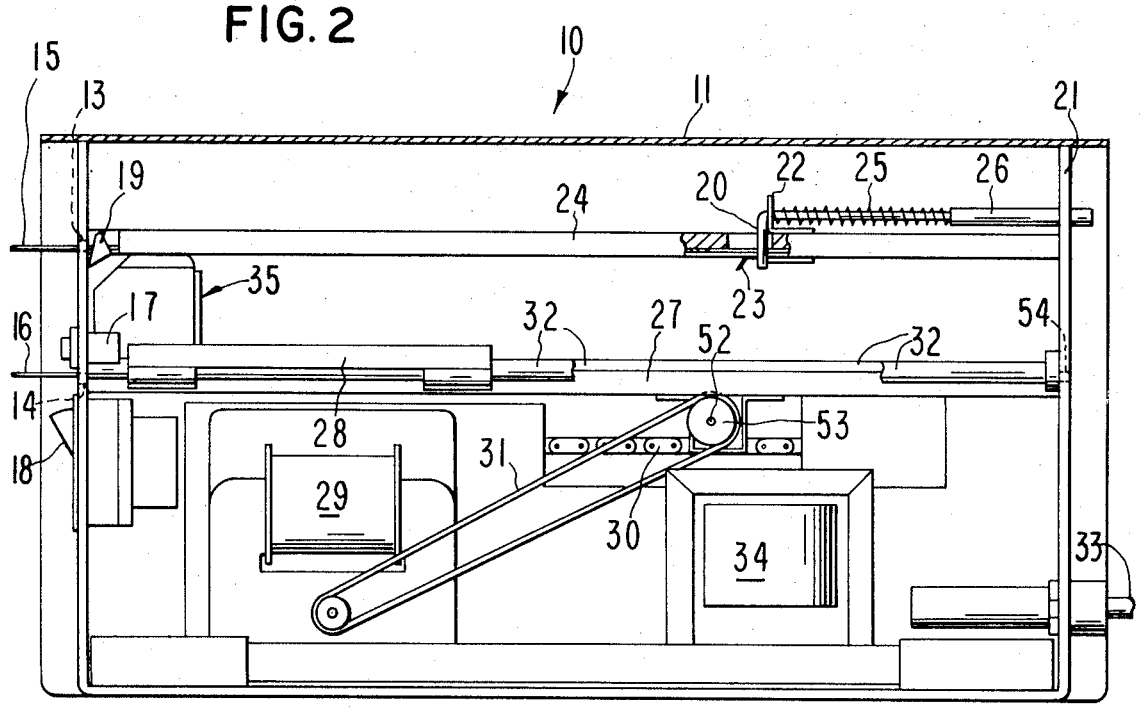
FIG. 2 is a side view of the apparatus, with the cover removed, looking from the right side of the machine (facing the front)

Referring to FIG. 2, the card-reading machine 10 of the invention is first turned on using switch 18. At that time, light 17 will be illuminated. Next the master card 15 is inserted into slot 13, marking side down, and guided by bevel guide means 19 into the machine. The card 15 rests upon tray 24. When properly inserted, card 15 abuts the end of L-shaped rod 20. Rod 20 is held in the machine through opening 21 in the rear of the machine by bracket 22. Master card 15 is also held in the machine flush against tray 24 by master card clamping spring 23. Rod 20 also has a spring 25 and a handle 26 which together serve to push the master card 15 forward and out the opening 13. If a locking cover (not shown) is employed, however, pushing from the rear of the machine on handle 26 will not serve to push card 15 out slot 13 in the front of the machine because the card will be blocked by such a cover.

Answer card 16 is inserted face up in the machine, usually by the student, into slot 14. The answer card rests upon tray 27. The insertion of the answer card automatically starts the operation of the machine. The mechanism to accomplish this will be described later in connection with FIG. 3.

The cards are read simultaneously by a sensor-array transport 28 carrying two arrays of photosensors (not shown in FIG. 2) for simultaneously optically reading the master and the answer cards. Transport 28 is driven across the cards by motor 29, which turns chain-drive 30 which, as will be described in detail later, pulls transport 28 back and forth along the length of the machine. The same motor also drives belt 31 which, as will be described later, serves as the eject mechanism for the answer card through slot 54 when the grading of the card has been completed. Transport 28 is guided along two parallel guide rods 32, only one of which is visible in FIG. 2. The machine is powered by an a-c line cord 33 coupled to a transformer 34 to reduce the voltage.

Figure 3:
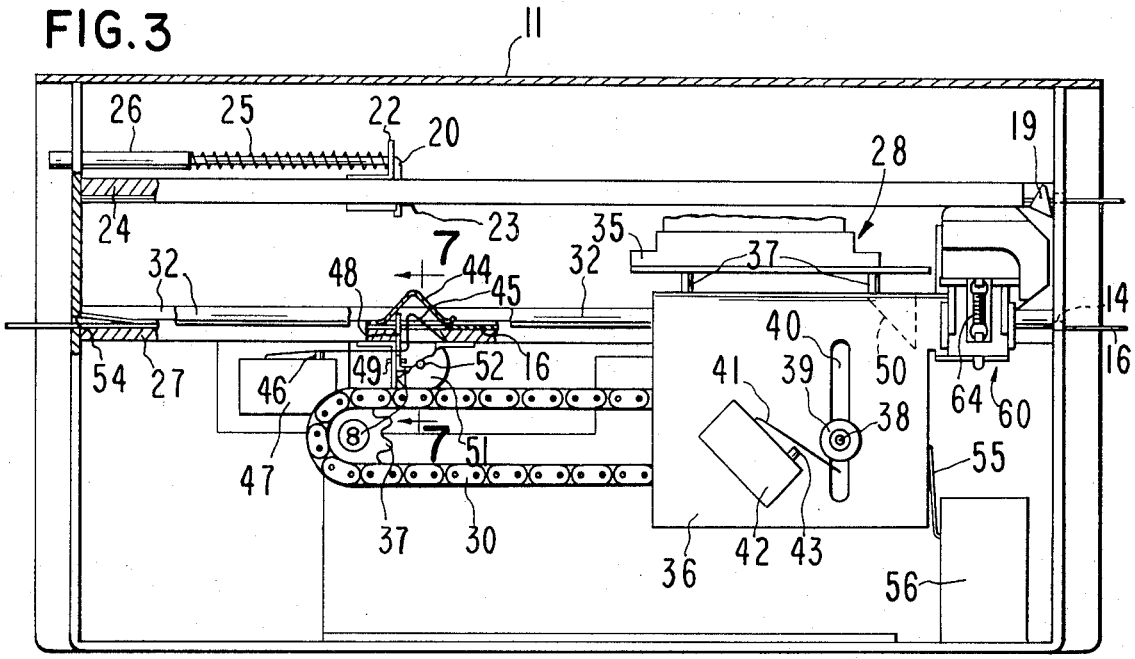
FIG. 3 is a side view, with the cover removed, looking from the left side of the machine (facing the front)

Referring to FIG. 3, the reading cycle is started by the insertion of answer card 16 into slot 14. The insertion of card 16 is stopped by bar 48 which is pivotally held to arm 8 by pivot rod 49. Answer card 16 is slipped under retaining spring 44. During insertion, answer card 16 abuts against actuator spring 45. The pressure of card 16 against the angled portion of actuator spring 45 depresses the spring against button 46 on microswitch 47, thus closing the microswitch. The closure of microswitch 47 starts the motor into motion which drives gear 37 and thus chain 30 in a clockwise direction.

Card reader 35 is mounted onto transport bracket 36 using screws and spacers 37. Transport bracket 36 is mounted slideably onto guide rods 32. The sliding motion of the transport is controlled by chain 30. Chain 30 is driven by gear 37 which is motor driven. Chain 30 is coupled to transport bracket 36 by means of screw 38 and washer 39. Washer 39 slides up and down in vertical track 40. Screw 38 passes through a link of chain 30. Accordingly, card reader 35 mounted upon transport bracket 36 slides forward and backwards as gear 37 on the motor turns chain 30. During the vertical portion of the movement of chain 30, screw 38 and washer 39 slide upwards and downwards in track 40 of bracket 36.

As chain 30 moves clockwise on gear 37 from the position shown in FIG. 3, the action is as follows. First screw 28 and washer 39 move downwards in track 40. Since washer 39 abuts against the blade 41 of microswitch 42, this downward motion of washer 39 depresses blade 41 of the microswitch against actuator button 43, closing microswitch 42. The closing of microswitch 42 energizes the error marker 60 so that it will mark errors when signalled during the leftward sweep of card reader 35. This will be described in more detail later. Once microswitch 42 is closed and washer 39 and screw 38 are at their lowermost position, as the clockwise motion of the chain continues, it pulls bracket 36 and reader 35 leftward. During this leftward motion, the reading and error-marking functions are performed. As soon as transport 28 proceeds as far leftward as possible, and washer 39 and screw 38 move upward around gear 37, blade 41 of microswitch 42 is released, turning off the error marker 60 to prevent additional superfluous marks on the rightward return portion of the chain-drive cycle. The reading operation of the card in the machine has been completed at this point and the transport 28 will now be returned to its initial rightward position shown in FIG. 3. At the end of the reading cycle, when transport 28 is at its most leftward position, card 15 is automatically removed from the machine through slot 54.

Figure 7:
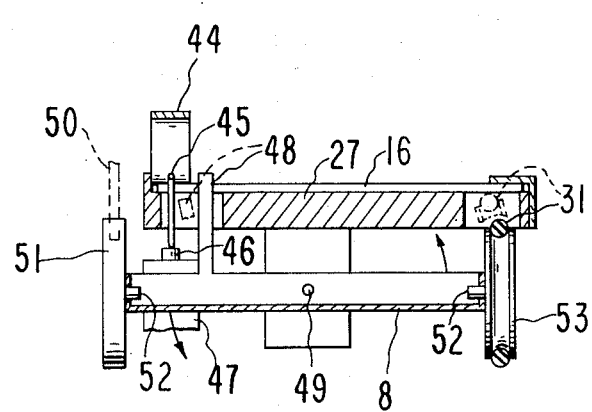
FIG. 7 is a detail cross-sectional view of the card reject mechanism along the line 7—7 of FIG. 3.

A detailed view of the card reject mechanism is shown in FIG. 7. Referring to FIGS. 3 and 7, as the transport 28 and bracket 36 reach their leftward most position, cam 50 abuts against wheel 51, pushing wheel 51 downwardly (as viewed in FIG. 7), thus pivoting arm 8 counterclockwise in on pivot rod 49 in the direction of the arrows shown in FIG. 7. As arm 8 pivots counterclockwise, bar 48 moves downwardly out of the path of card 16. At the most counterclockwise position of arm 8, the top of bar 48 will be below the plane of answer card 16. As the top of bar 48 falls below the plane of answer card 16, releasing card 16, belt 31 and pulley 53 concurrently rise upwardly on the other end of arm 8 until belt 31, which is spinning, touches and makes frictional contact with the bottom of card 16. At the most counterclockwise position of arm 8, wheel 50, the top of bracket 48, and belt 31 are all in the positions shown by dotted lines in FIG. 7. Spinning belt 31 then comes into contact with the underside of card 16, and card 16 is impelled in a leftward direction (shown in FIG. 3) out of the machine through slot 54.

After the ejection of answer card 15, the continuous motion of chain 30 begins to move transport 28 in a rightward direction. Cam 50 then becomes disengaged from wheel 51. Arm 8 then returns to its horizontal position shown by solid lines in FIG. 7. The transport 28 is returned to its initial rightward most position. As transport 28, including bracket 36, reach their most rightward position, shown in FIG. 3, bracket 36 engages blade 55 of microswitch 56, which turns off the motor which drives gear 37. Thus the cycle has been completed and will not be restarted until a new answer card is inserted.

Figure 4:
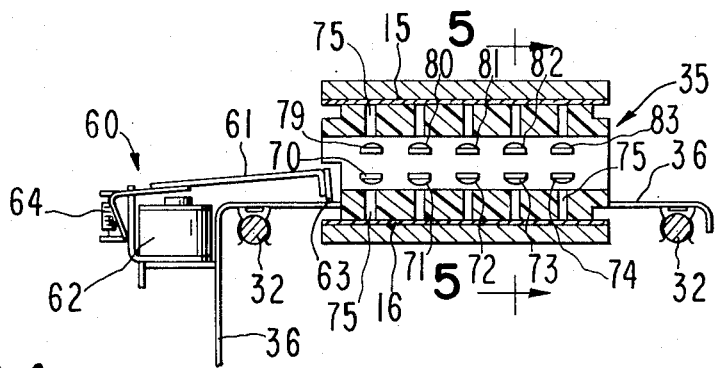
FIG. 4 is a detail view, partially in cross-section, showing the card reader and the marker.

Although it is possible to mark answers as correct, it is conventional in an apparatus of the type of the invention to have a marker which only places a mark in the event of a wrong answer. Marker 60 shown in FIGS. 3 and 4 is used for that purpose. Although the details of how the electronic signals are generated which indicate that an error should be marked will be described later, the mechanical operation of marker 60 itself is extremely simple. Marker arm 61 is driven by solenoid magnet 62 which is actuated by an electrical signal or pulse. Pen 63, in response to such a pulse, places an error mark on answer card 16. Preferably, the marking pen is comprised of a highly abrasion-resistant, elastomeric polymer with a high tensile and tear strength. Polyurethane material works well, for example. The pen is inked using conventional capillary inking from a storage reservoir (not shown). After such a mark has been made and the power to solenoid 62 has been shut off at the end of the pulse, arm 61 is returned to its initial position shown in FIG. 4 by the action of spring 64.

Figure 5:
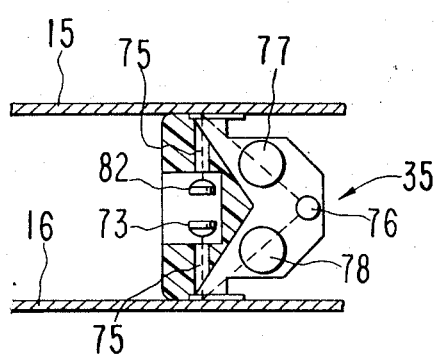
FIG. 5 is a cross-sectional view of the card reader of FIG. 4 along the line 5—5.

The arrays of photosensors used for optically reading the master and the answer card simultaneously are best seen in FIGS. 4 and 5. The answer card reading array consist of photosensitive devices, for example photodiodes 70, 71, 72, 73, and 74. These photosensitive devices are focused through individual tunnels 75 onto appropriate portions of answer card 16. There are an equal number (five in the illustrated embodiment) of light sensing devices for sensing the master card 15. These devices are numbered 79, 80, 81, 82 and 83, all as shown in FIG. 4.

The illumination of both master and answer cards is accomplished by a single light source 76, seen in FIG. 5. The light source is focused through two lensing means, for example cylinders 77 and 78 shown in cross-section in FIG. 5. Light source 76 is focused through cylinder 77 across the width of master card 15. The light beam is shown in dashed line. Similarly, light source 76 is focused through lensing cylinder 78 across the width of answer card 16. That light beam is also shown with a dashed line. The light is reflected off the portions of cards 15 and 16 adjacent to tunnels 75, as shown in FIG. 5. The reflected light from answer card 16 is focused through the tunnel shown in FIG. 5 onto light sensitive device 73; the light reflected from the master card 15 is focused through the tunnel shown in FIG. 5 onto light sensitive device 82.

One particular advantage of the apparatus of the invention, wherein stationary, opposed master and answer cards are read by a single moving transport containing both master and answer card-reading arrays is that alignment of corresponding rows between master and answer card is very simple. Assuming both master and answer cards are placed properly into the machine, and abutting against rod 20 and bar 48, respectively (shown in FIG. 3), the user can be absolutely certain that the correct corresponding rows of the master and answer card are being simultaneously read.

Figure 6:
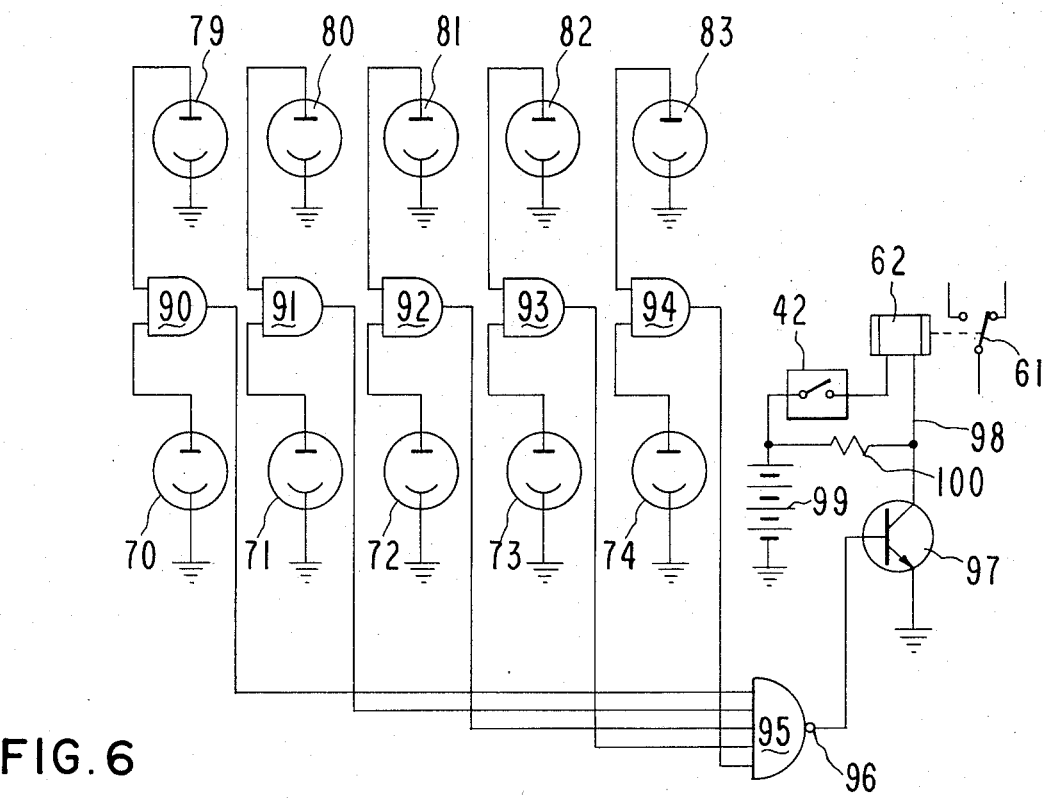
FIG. 6 is a schematic circuit diagram of the reading and marking circuitry.

In normal operation of the invention, the answer and master cards are marked identically to indicate a correct answer. If it were desired for the apparatus of the invention, wired as described above, to mark the correct answers rather than the incorrect answers on the answer card, the teacher need only place marks in all of the incorrect positions on the master card. Then the machine will put an error mark on the answer card for all correct responses, but not for incorrect ones. Obviously, changes in circuitry could be made so that a mark on the answer card would correspond to the lack of a mark on the master card. However, both simplicity of explanation and usage is accomplished by having the one-to-one correspondence. The circuitry shown in FIG. 6 is designed for a mark on the answer card to correspond to a mark on the master card at the same location. Furthermore, the circuitry is designed so that a correct answer is designated by the presence or absence of all of the appropriate markings in an individual row of five marks (one mark or the lack thereof under each of the photosensors for the answer card 70– 74; and one mark or the lack thereof at the corresponding location under each of the five photosensors for the same row of the answer card being read by photosensors 79–83).

As shown in FIG. 6, an output terminal from each of the photosensitive devices 70 and 79, corresponding to the first position in a row on both the answer and the master cards, respectively, are connected to AND gate 90. Photosensitive devices 80 and 71 are connected to AND gate 91; devices 81 and 72 are connected to AND gate 92; devices 82 and 73 are connected to AND gate 93; and devices 83 and 74 are connected to AND gate 94. Assuming that the answers marked on the answer card for the particular row of five possible markings are all correct, and correspond to the same row of a similarly marked master card, positive output signals will be received from each of the photosensitive devices which detect a marked position. The opposite electrical output signal will be received from each of the photosensitive devices which simultaneously detect the lack of a marking. Since AND gates 90 through 94 will provide a positive output signal so long as the inputs from the master and corresponding answer card-reading photosensors provide an identical electrical output signal, with correct answers in all five positions in the row all five AND gates 90–94 will provide positive electrical output signals which are then fed, as shown in FIG. 6, to master AND gate 95.

Assuming the proper coincidence was detected by the master and the answer card reading arrays for all five positions in the row, master AND gate 95 will provide an output signal indicating coincidence on its five input lines, which is indicative of a correct answer on the line. Inverter 96 then inverts the output signal from AND gate 95, so that no positive input signal is applied to the base of transistor 97. Transistor 97 controls the energization of the solenoid 62 which is used to mark an error. Since the appropriate coincidence was received at the input of AND gate 95 for a correct answer, no error should be marked, and therefore no marking signal is applied to transistor 97 (as a result of inverter 96).

However, a lack of coincidence between one of the five positions in a row on the master and answer cards prevents at least one positive input signal on one of the lines going into master AND gate 95, and therefore prevents an output signal indicating coincidence from AND gate 95. This lack of an output signal is inverted by inverter 96, applying a positive input signal to the base of transistor 97. This signal then turns the transistor on and applies an input signal along line 98 to solenoid 62 which, as shown in FIG. 4, actuates the marker arm 61 to mark an error on the answer card. Switch 42 is closed during the reading cycle of the transport and open during the return cycle, as explained earlier. The power supply for energizing marker solenoid 62 is shown schematically in FIG. 6 as a battery 99. Resistor 100 is a bias resistor for transistor 97.

Obviously the master and answer cards could be arranged so that all five markings in a row are not required for a single correct answer. For example, two of the five marking locations in a single row can be used for a true or false indication for one question, and the remaining three locations in the same row can be used for a multiple choice answer to a different question. In that event, it would be obvious to one skilled in the art that the logic diagram for the connections shown in FIG. 6 between the master and answer card arrays must be different, and different appropriate logic circuitry and gating will be employed to detect the appropriate coincidences. This can be accomplished by a wireable board in the machine using jumper wires, or any appropriate conventional way of rewiring the machine for a somewhat different logical condition, all as can readily be constructed by a knowledgeable logic designer. If desired, more than one error marker 60 may be employed for a single row.

If desired, the apparatus of the subject invention can be connected to various types of conventional tabulating equipment for tallying up the total wrong or the total right answers determined by the apparatus of the invention and for recording or printing the scores of each student, or of all the students in a class, in a school, or the like. Such tabulating equipment may rank the scores, otherwise compare them, if desired, and may store the scores on magnetic tape, disc, or other storage means. Apparatus of this nature is conventional in the art, so that detailed description of it in this application is considered unnecessary. If desired, a plurality of grading machines of the invention can be connected together to a single tabulator or computer.

What is claimed is:

1. Apparatus for grading optically readable answer cards wherein each card to be read is marked with optically readable marks in selected predetermined locations, said apparatus comparing a marked answer card with a correctly marked master card having optically readable marks in the locations corresponding to the correct selection of predetermined locations on said answer card, said apparatus comprising:

support means for holding said master and answer cards in stationary, opposed, face-to-face positions substantially parallel to each other;

a transport means carrying two arrays of photosensors for simultaneously optically reading said master card and said answer card, one array capable of reading all of the possible predetermined locations of marks on said answer card and the other array capable of reading all of the possible predetermined corresponding locations of marks on said master card;

means for moving said transport means simultaneously across both said cards to enable said arrays of photosensors to simultaneously read both cards, each array providing one of two opposite electrical output signals depending upon the existance or the non-existance of marks at each of said predetermined locations on the respective card being read; and comparison means for comparing each electrical output signal from the master card-reading array with the corresponding electrical output signal from the answer card-reading array, coincidence between such compared signals being indicative of a correct answer on said answer card.

2. The apparatus of claim 1 further characterized by said transport means moving along the length of said cards, and being located between their opposed faces.

3. The apparatus of claim 1 further characterized by said photosensors including a light source focused on said predetermined locations on said cards, and including solid-state photosensitive devices arranged and adapted to detect the light reflected off said predetermined locations, said photosensors providing one of said two opposite electrical output signals if such light is reflected off an unmarked location, and the other of said two opposite electrical output signals if such light is reflected off a marked location.

4. The apparatus of claim 3 further characterized by a single light source projecting a light beam onto the predetermined locations on the opposed faces of both of said cards simultaneously.

5. The apparatus of claim 1 further characterized by each array of photosensors simultaneously sensing the light reflected off a row of predetermined locations on its respective card, a different sensor in said array sensing light reflected off each predetermined location in said row, whereby the presence or absence of more than one mark in a row is simultaneously detected.

6. The apparatus of claim 5 further characterized by marking means connected to receive the output signals from a plurality of said photo-sensors within one row, and to indicate that the answers are correct only if all the output signals from the photosensors reading said plurality of marks on said answer card correspond with all corresponding output signals from the other array of photosensors reading the corresponding marks in the corresponding row on said master card.

7. The apparatus of claim 6 further characterized by said plurality of marks comprising an entire row.

8. The apparatus of claim 1 further characterized by the addition of a means for automatically rejecting the answer card after grading is completed comprising:

a moveable stop bar abutting one end of said answer card when said answer card rests in the position to be graded; and answer card removal means including means for moving said stop bar out of the path of said answer card, and impelling means for simultaneously impelling said answer card out of said apparatus.

9. The apparatus of claim 8 further characterized by said impelling means including a spinning belt which is mounted to come into frictional contact with said answer card after said stop bar has been moved out of said path.

10. The apparatus of claim 9 further characterized by said stop bar being mounted on one end of a pivoted arm and said spinning belt being mounted on the other.

* * * * *